(12) United States Patent
Zhao et al.

(10) Patent No.: US 8,000,390 B2
(45) Date of Patent: Aug. 16, 2011

(54) METHODS AND SYSTEMS FOR EFFICIENT PREDICTION-MODE SELECTION

(75) Inventors: Jie Zhao, Camas, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1449 days.

(21) Appl. No.: 11/380,726

(22) Filed: Apr. 28, 2006

(65) Prior Publication Data

US 2007/0253484 A1 Nov. 1, 2007

(51) Int. Cl.
*H04N 7/18* (2006.01)
(52) U.S. Cl. .......... 375/240.13; 375/240.12; 375/240.14
(58) Field of Classification Search . 375/240.01–240.29
See application file for complete search history.

(56) References Cited

U.S. PATENT DOCUMENTS

| | | | |
|---|---|---|---|
| 6,907,071 B2 | 6/2005 | Frojdh et al. | |
| 7,369,707 B2 * | 5/2008 | Sakaguchi et al. | 382/239 |
| 7,760,806 B2 * | 7/2010 | Marpe et al. | 375/240.12 |
| 2005/0135484 A1 | 6/2005 | Lee et al. | |
| 2005/0190977 A1 | 9/2005 | Jeon et al. | |

FOREIGN PATENT DOCUMENTS

WO  WO 2004/080084 A1  9/2004

OTHER PUBLICATIONS

Jongho Kim and Jechang Jeong, "Fast intra-mode decision in H.264 video coding using simple directional masks," Visual Communications and Image Processing 2005—Proc. of SPIE vol. 5960, 2005, pp. 1071-1079, vol. 5960, SPIE, Bellingham, WA, USA.

Keng-Pang Lim, Gary Sullivan and Thomas Wiegand, "Text Description of Joint Model Reference Encoding Methods and Decoding Concealment Methods," Joint Video Team (JVT) of ISO/IEC MPEG and ITU-T VCEG, Jan. 2005, Hong Kong, China.

* cited by examiner

*Primary Examiner* — Andy S Rao
(74) *Attorney, Agent, or Firm* — Kristine E. Matthews; David C. Ripma

(57) ABSTRACT

Embodiments of the present invention comprise methods and systems for efficient prediction-mode selection.

23 Claims, 7 Drawing Sheets

| 30 |    | 32 | 34 |
|----|----|----|----|
|    |    |    |    |
|    |    | 33 |    |
| 31 |    |    | 35 |

FIG. 4

| 40 |    |    | 41 |
|----|----|----|----|
|    |    |    |    |
| 42 |    | 43 |    |
| 44 |    |    | 45 |

FIG. 5

|    | 50 |    | 52 |
|----|----|----|----|
| 51 |    |    |    |
|    |    |    | 54 |
| 53 |    | 55 |    |

FIG. 6

| 62 |    | 60 |    |
|----|----|----|----|
|    |    |    | 61 |
| 64 |    |    |    |
|    | 65 |    | 63 |

FIG. 7

| 70 | 72 | 74 |    |
|----|----|----|----|
|    |    |    |    |
|    |    | 73 |    |
|    | 71 |    | 75 |

FIG. 8

| 80 |    |    |    |
|----|----|----|----|
| 82 |    |    | 81 |
| 84 |    | 83 |    |
|    |    |    | 85 |

FIG. 9

|    | 90 | 92 | 94 |
|----|----|----|----|
|    |    |    |    |
|    |    | 93 |    |
| 91 |    | 95 |    |

FIG. 10

|    |    |    | 100 |
|----|----|----|-----|
| 101|    |    | 102 |
|    |    | 103| 104 |
| 105|    |    |     |

METHODS AND SYSTEMS FOR EFFICIENT PREDICTION-MODE SELECTION

FIELD OF THE INVENTION

Embodiments of the present invention comprise methods and systems for efficient prediction-mode selection.

BACKGROUND

In many video encoder and decoders, a picture is partitioned into fixed-size macroblocks for which the decoding process is specified. Typically each macroblock covers a picture area of 16×16 samples (also considered pixels) in the luma channel and 8×8 samples in each of the two chroma channels. Other macroblock sizes and luma to chroma ratios may be used. In some video coding standards, a picture may be split into one or several slices where a slice is a sequence of macroblocks.

In the H.264/AVC video coding standard, hereinafter H.264, luma and chroma samples of a macroblock are predicted either spatially (intra prediction) or temporally (inter prediction), and the prediction residual is encoded using transform coding. To exploit spatial correlation among pixels, H.264 defines several intra prediction modes: nine 4×4 intra luma prediction modes, nine 8×8 intra luma prediction modes (FRExt profile only), four 16×16 intra luma prediction modes, and four chroma prediction modes. It is desirable for the encoder to use the intra prediction mode that yields the smallest prediction cost, typically in a rate-distortion sense, among all the modes. Hence, the mode-selection process is time consuming if the encoder examines the cost of each of the intra prediction modes one-by-one.

Additionally, the H.264 standard allows intra prediction in inter coded slices. For a macroblock in an inter slice, the chance that an intra mode yields a lower prediction cost than inter prediction is very small. However, the encoder would still have to examine the cost of each of the intra prediction modes and compare them with the cost of inter prediction. Since there are so many different intra prediction modes, it is very inefficient and time consuming to examine the cost of each mode.

Efficient methods and systems for prediction-mode selection are desirable.

SUMMARY

Embodiments of the present invention comprise systems and methods for efficient prediction-mode selection comprising generating direction costs.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a diagram showing prediction mode directions;

FIGS. 2a-i are diagrams showing intra prediction methods for a plurality of directions;

FIG. 3 is a diagram showing a direction mask in the vertical direction;

FIG. 4 is a diagram showing a direction mask in the horizontal direction;

FIG. 5 is a diagram showing a direction mask in the diagonal-down-left direction;

FIG. 6 is a diagram showing a direction mask in the diagonal-down-right direction;

FIG. 7 is a diagram showing a direction mask in the vertical-right direction;

FIG. 8 is a diagram showing a direction mask in the horizontal-down direction;

FIG. 9 is a diagram showing a direction mask in the vertical-left direction;

FIG. 10 is a diagram showing a direction mask in the horizontal-up direction;

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

In intra-frame prediction, the samples of a macroblock (MB) may be predicted from previously decoded, available samples of the frame. Sub-blocks of the macroblock may be predicted separately or the macroblock may be intra predicted in its entirety. The encoder may decide on an intra prediction mode from a plurality of candidate intra prediction modes based on the costs of encoding the macroblock or sub-block using the candidate intra prediction modes.

Some embodiments of the present invention comprise methods and systems for determining the intra prediction mode for the macroblock or sub-block. Other embodiments of the present invention comprise methods and systems for determining if intra prediction may be skipped after the best inter coding mode has been determined.

In the descriptions that follow, the term "block" will be used to refer to a rectangular region, either a macroblock or a sub-block of a macroblock, of samples (also considered pixels) wherein the samples may be luminance data, chrominance data, or any other data descriptive of an image. The block geometry is not limited to square. Prediction of the samples in a block may be referred to as block prediction or prediction of a block.

Figure 1:
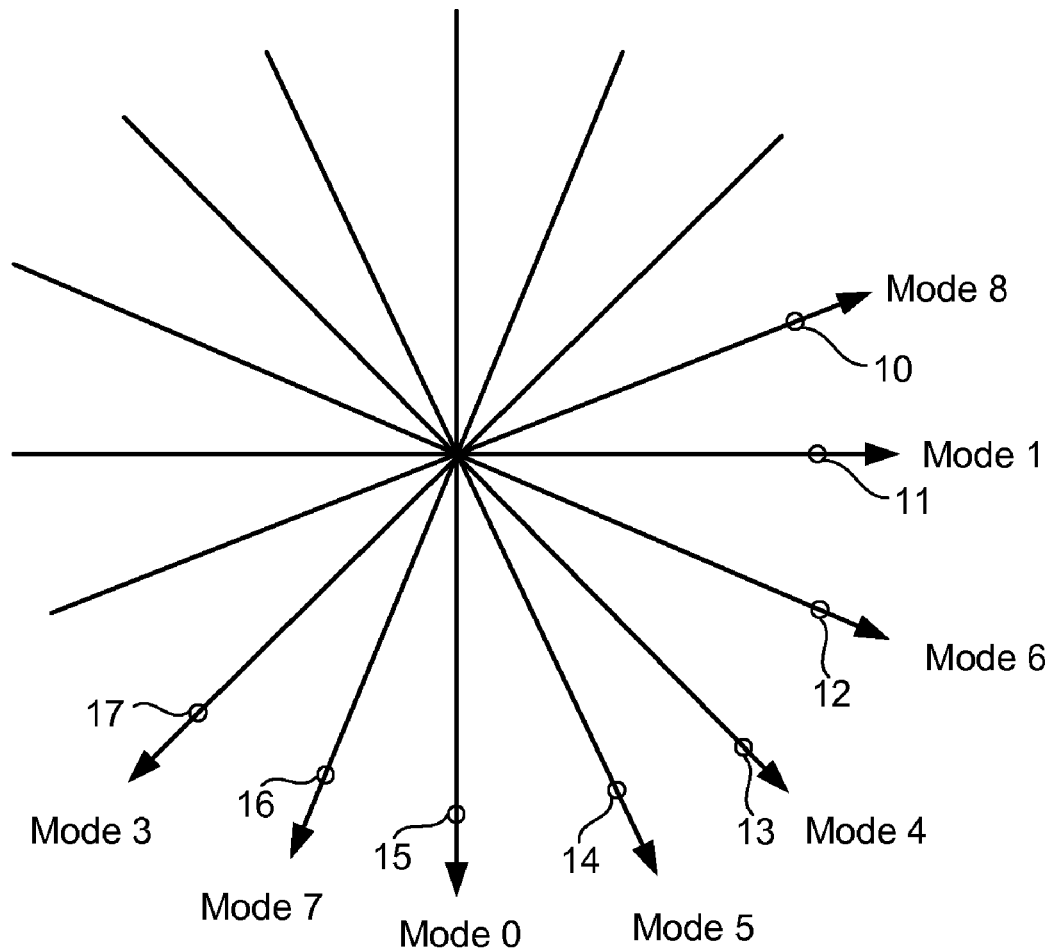
Figures 2A, 2B, 2C, 2D, 2E, 2F, 2G, 2H, 2I:
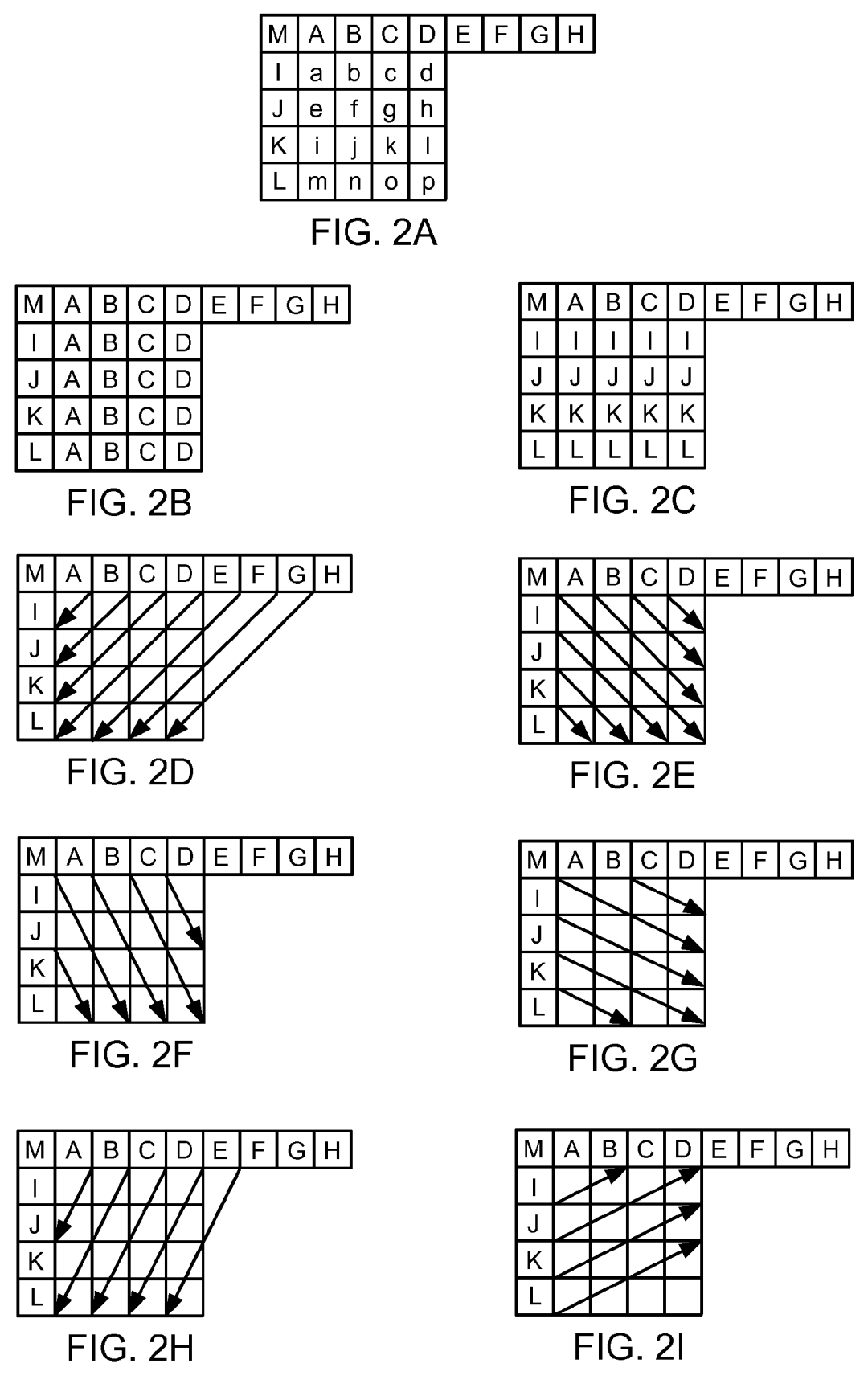

FIG. 1 depicts the directions along which the prediction of a block may be made, and the direction may be considered the intra prediction mode. FIG. 2a shows an exemplary 4×4 block of samples 20 labeled a-p that may be predicted from samples labeled A-M. When samples E-H are not available, in some embodiments they may be replaced by sample D.

Intra prediction mode 0 (prediction mode direction indicated as 15 in FIG. 1) may be referred to as vertical-mode intra prediction. In mode 0, or vertical-mode intra prediction, the samples of a block may be predicted from the previously decoded samples in the vertical direction. FIG. 2b illustrates an exemplary vertical prediction of the samples in a 4×4 block. In FIG. 2b, the samples labeled a-p in FIG. 2a are shown replaced with the label of the sample label from FIG. 2a from which they are predicted.

Intra prediction mode 1 (prediction mode direction indicated as 11 in FIG. 1) may be referred to as horizontal-mode intra prediction. In mode 1, or horizontal-mode intra prediction, the samples of a block may be predicted from the previously decoded samples in the horizontal direction. FIG. 2c illustrates an exemplary horizontal prediction of the samples in a 4×4 block. In FIG. 2c, the samples labeled a-p in FIG. 2a are shown replaced with the label of the sample label from FIG. 2a from which they are predicted.

Intra prediction mode 3 (prediction mode direction indicated as 17 in FIG. 1) may be referred to as diagonal-down-left-mode intra prediction. In mode 3, the samples of a block may be predicted in the direction shown in FIG. 2d.

Intra prediction mode 4 (prediction mode direction indicated as 13 in FIG. 1) may be referred to as diagonal-down-right-mode intra prediction. In mode 4, the samples of a block may be predicted in the direction shown in FIG. 2e.

Intra prediction mode 5 (prediction mode direction indicated as 14 in FIG. 1) may be referred to as vertical-right-mode intra prediction. In mode 5, the samples of a block may be predicted in the direction shown in FIG. 2f.

Intra prediction mode 6 (prediction mode direction indicated as 12 in FIG. 1) may be referred to as horizontal-down-mode intra prediction. In mode 6, the samples of a block may be predicted in the direction shown in FIG. 2g.

Intra prediction mode 7 (prediction mode direction indicated as 16 in FIG. 1) may be referred to as vertical-left-mode intra prediction. In mode 7, the samples of a block may be predicted in the direction shown in FIG. 2h.

Intra prediction mode 8 (prediction mode direction indicated as 10 in FIG. 1) may be referred to as horizontal-up-mode intra prediction. In mode 8, the samples of a block may be predicted in the direction shown in FIG. 2i.

In intra prediction mode 2, which may be referred to as DC mode, all samples labeled a-p in FIG. 2a may be replaced with the average of samples labeled A-D and I-L in FIG. 2a.

The nine intra prediction modes described above correspond to the nine intra prediction modes for luminance samples in the 4×4 sub-blocks or 8×8 sub-blocks of a 16×16 macroblock in H.264.

H.264 also supports four 16×16 luma intra prediction modes in which the 16×16 samples of the macroblock are extrapolated from the upper and/or left-hand encoded and reconstructed samples adjacent to the macroblock. The samples may be extrapolated vertically, mode 0 (similar to mode 0 for the 4×4 size block), or the samples may be extrapolated horizontally, mode 1 (similar to mode 1 for the 4×4 size block). The samples may be replaced by the mean, mode 2 (similar to the DC mode for the 4×4 size block), or a mode 3, referred to as plane mode, may be used in which a linear plane function is fitted to the upper and left-hand samples.

In H.264, each 8×8 chroma component of a macroblock may be predicted from chroma samples above and/or to the left that have previously been encoded and reconstructed. H.264 supports four chroma prediction modes similar to the 16×16 luma prediction modes described above. The mode numbers are different for the chroma prediction modes: DC is mode 0; horizontal is mode 1; vertical is mode 2; plane is mode 3.

In some embodiments of the present invention, directional masks may be used to obtain direction information from a block. Directional masks of the present invention may comprise some samples of the interior rows and columns of the block making the directional masks more robust. FIGS. 3-10 show exemplary directional masks for a 4×4 block of samples. The cost of a prediction mode may be estimated using the directional masks of the present invention.

Samples 30-35 shown in FIG. 3 may be used in calculating the direction-mode cost for a vertical-prediction mode. One exemplary cost function is:

$$\text{cost}_0 = |s30-s31|+|s32-s33|+|s34-s35|,$$

where s30, s31, s32, s33, s34, and s35 denote the sample values at sample locations 30-35, respectively.

Samples 40-45 shown in FIG. 4 may be used in calculating the direction-mode cost for a horizontal-prediction mode. One exemplary cost function is:

$$\text{cost}_1 = |s40-s41|+|s42-s43|+|s44-s45|,$$

where s40, s41, s42, s43, s44, and s45 denote the sample values at sample locations 40-45, respectively.

Samples 50-55 shown in FIG. 5 may be used in calculating the direction-mode cost for a diagonal-down-left-prediction mode. One exemplary cost function is:

$$\text{cost}_3 = |s50-s51|+|s52-s53|+|s54-s55|,$$

where s50, s51, s52, s53, s54, and s55 denote the sample values at sample locations 50-55, respectively.

Samples 60-65 shown in FIG. 6 may be used in calculating the direction-mode cost for a diagonal-down-right-prediction mode. One exemplary cost function is:

$$\text{cost}_4 = |s60-s61|+|s62-s63|+|s64-s65|,$$

where s60, s61, s62, s63, s64, and s65 denote the sample values at sample locations 60-65, respectively.

Samples 70-75 shown in FIG. 7 may be used in calculating the direction-mode cost for a vertical-right-prediction mode. One exemplary cost function is:

$$\text{cost}_5 = |s70-s71|+|s72-s73|+|s74-s75|,$$

where s70, s71, s72, s73, s74, and s75 denote the sample values at sample locations 70-75, respectively.

Samples 80-85 shown in FIG. 8 may be used in calculating the direction-mode cost for a horizontal-down-prediction mode. One exemplary cost function is:

$$\text{cost}_6 = |s80-s81|+|s82-s83|+|s84-s85|,$$

where s80, s81, s82, s83, s84, and s85 denote the sample values at sample locations 80-85, respectively.

Samples 90-95 shown in FIG. 9 may be used in calculating the direction-mode cost for a vertical-left-prediction mode. One exemplary cost function is:

$$\text{cost}_7 = |s90-s91|+|s92-s93|+|s94-s95|,$$

where s90, s91, s92, s93, s94, and s95 denote the sample values at sample locations 90-95, respectively.

Samples 100-105 shown in FIG. 10 may be used in calculating the direction-mode cost for a horizontal-up-prediction mode. One exemplary cost function is:

$$\text{cost}_8 = |s100 - s101| + |s102 - s103| + |s104 - s105|,$$

where s100, s101, s102, s103, s104, and s105 denote the sample values at sample locations 100-105, respectively.

Figure 11:
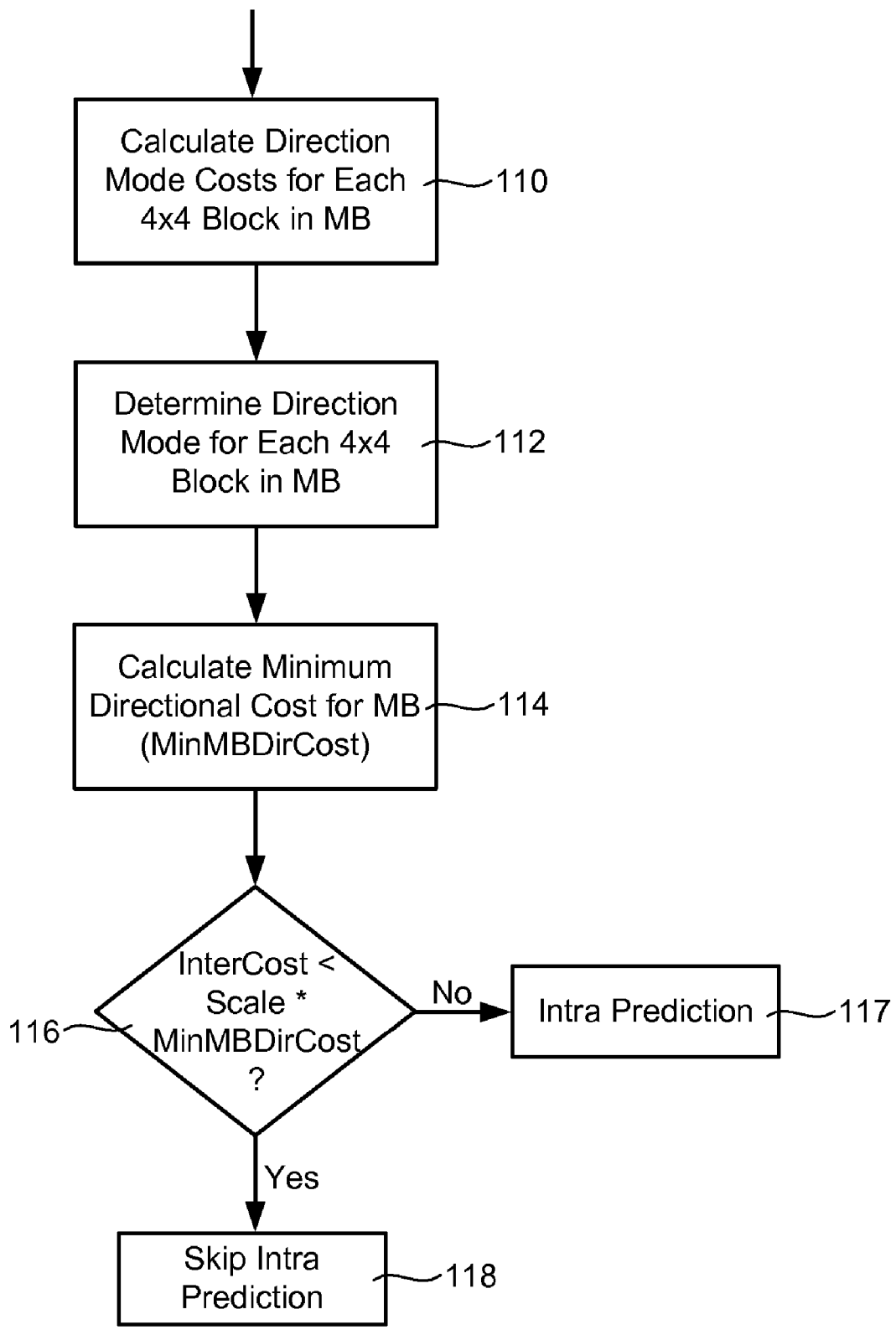
FIG. 11 is a flow diagram showing embodiments of the present invention comprising calculating direction mode costs and direction modes for sub-blocks of a macroblock.
Figure 12:
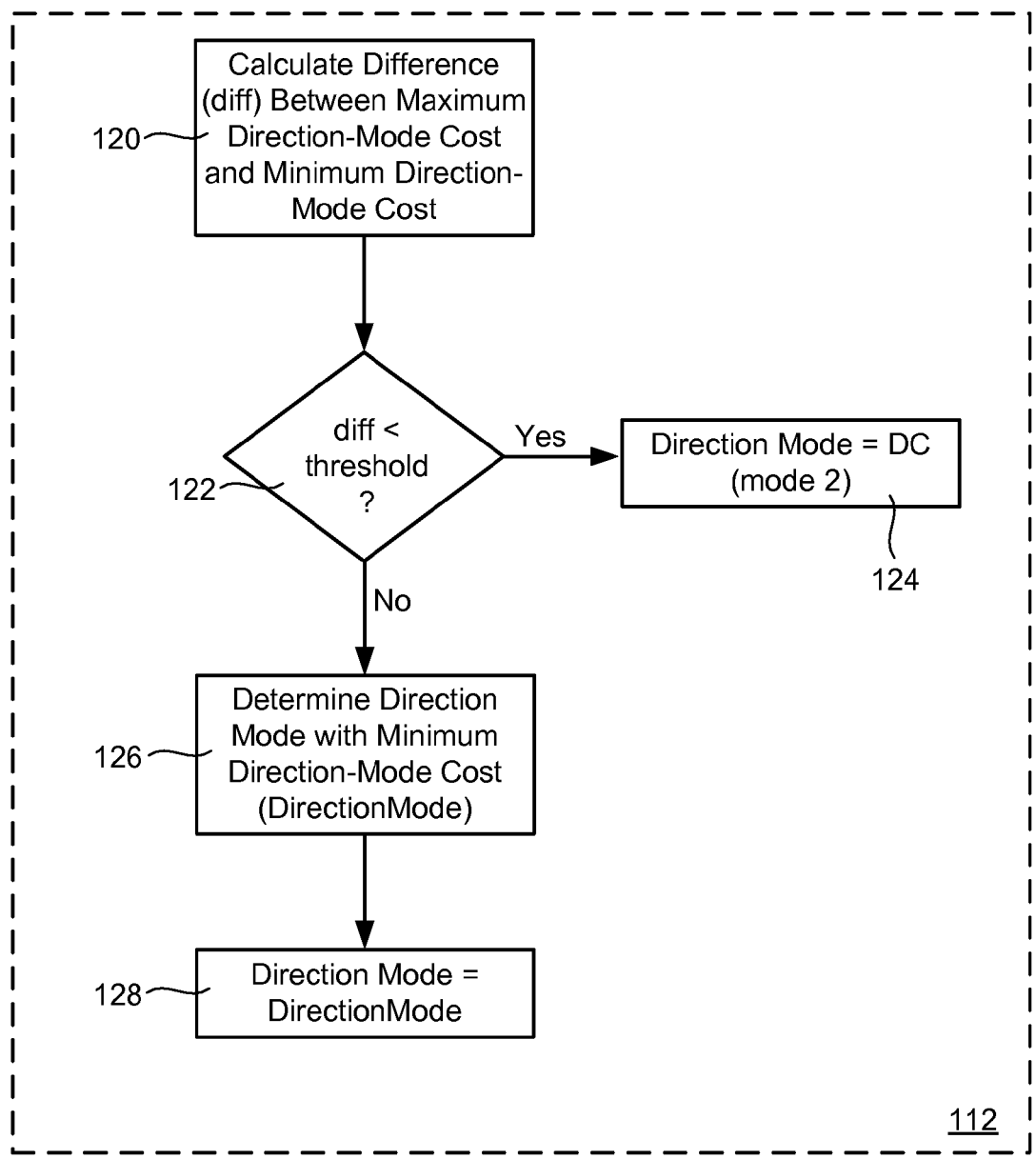
FIG. 12 is a flow diagram showing embodiments of the present invention comprising determining a direction mode from a plurality of direction costs.

FIG. 11 shows embodiments of the present invention in which direction-mode costs for each 4×4 block in a 16×16 macroblock may be used by an encoder to determine whether or not to perform intra prediction for the macroblock. These exemplary embodiments may be described using 4×4 sub-blocks of a 16×16 macroblocks, but the size of the sub-block and the size of the macroblock is not limited to 4×4 and 16×16, respectively. In some embodiments, the direction-mode cost of each of the eight modes may be calculated 110 for each 4×4 sub-block of a 16×16 macroblock using the direction masks and cost functions described above. The direction mode for each sub-block may be determined from the direction-mode costs of the eight direction modes 112 and the DC mode. FIG. 12 shows embodiments of the present invention for determining the direction mode from the direction-mode costs.

The difference (diff) between the maximum direction-mode cost and the minimum direction-mode cost 120 for a 4×4 block may be determined. This difference value (diff) may be compared to a threshold value 122. If the difference (diff) is less than a threshold value, then the direction mode for the 4×4 block may be the DC mode 124. If the difference value (diff) is not less than the threshold value, the direction mode for the 4×4 block with minimum cost (DirectionMode) is determined 126, and the direction mode for the 4×4 block may be DirectionMode 128.

After the direction mode is determined 112 for each 4×4 sub-block of the macroblock, the minimum directional cost for the macroblock (MinMBDirCost) may be calculated 114. In some embodiments of the present invention, the minimum direction cost for the macroblock (MinMBDirCost) may be calculated by summing, over all 4×4 sub-blocks, the cost of the sub-block direction mode. In other embodiments of the present invention, the minimum direction cost for the macroblock (MinMBDirCost) may be the maximum direction mode cost of the 4×4 sub-blocks.

The minimum directional cost of the macroblock (MinMBDirCost) may be compared to the minimum cost of inter prediction, and intra prediction may be skipped if the minimum cost of inter prediction is less than the minimum directional cost of the macroblock.

In some embodiments, the minimum directional cost for the macroblock (MinMBDirCost) may be scaled first and then compared to the minimum cost of inter prediction 116. If the minimum cost of inter prediction is less than the scaled minimum direction cost for the macroblock, then intra prediction may be skipped 118. If the minimum cost of inter prediction is not less than the scaled minimum direction cost for the macroblock, then intra prediction may be performed 117.

In some embodiments of the present invention, the scaling factor may be dependent on how the cost of inter prediction, the cost of intra prediction, and the minimum direction cost for the macroblock (MinMBDirCost) are determined. In some embodiments of the present invention, the scaling factor may be determined experimentally. In some embodiments of the present invention, the scaling factor may be selected to be (QP+20)/4) where QP is the quantization parameter used at the encoder.

Some embodiments of the present invention comprise methods and systems for fast intra prediction. Some embodiments of the present invention comprise methods and systems for fast intra prediction mode selection for 4×4 luma prediction, and alternate embodiments comprise methods and systems for fast intra prediction mode selection for 8×8 luma prediction.

Figure 13:
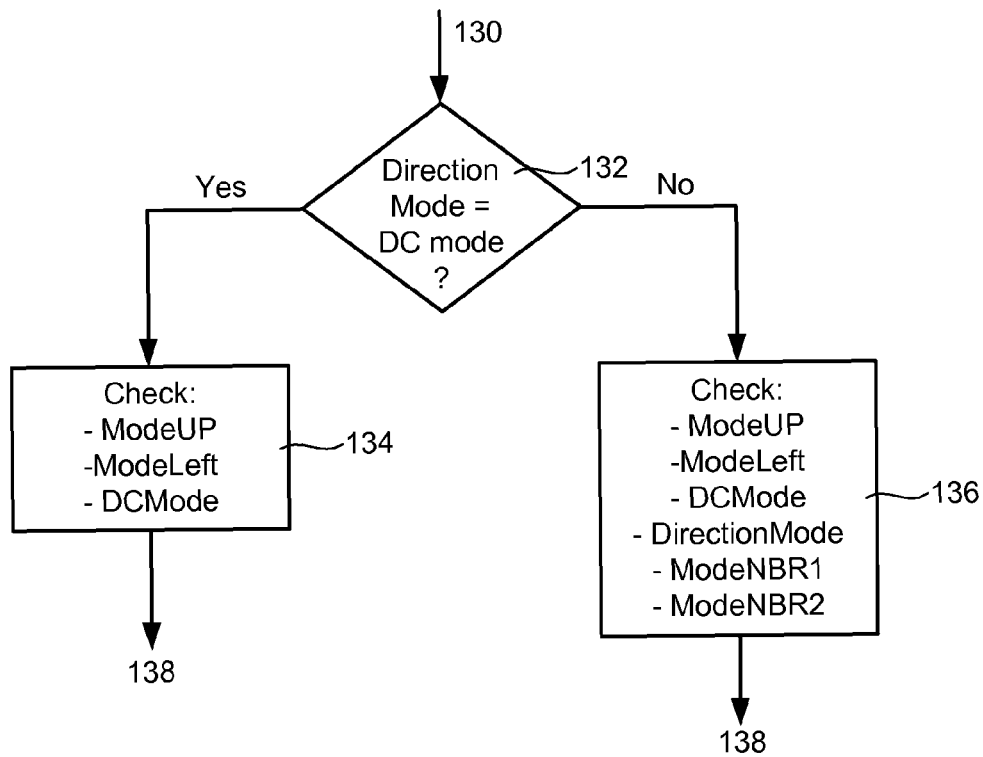
FIG. 13 is a flow diagram showing embodiments of the present invention comprising determining candidate prediction modes based on a direction mode.

FIG. 13 shows an exemplary embodiment of the present invention in which the direction mode of the sub-block may be used to reduce the number of candidate intra modes that an encoder may examine to determine the intra prediction mode. The direction mode for a 4×4 sub-block 130 may be examined to determine if it is the DC mode 132. If the direction mode for the sub-block is DC mode, then up to three candidate modes may be examined 134 to determine the intra prediction mode for the 4×4 sub-block. The three modes are the DC mode (DCMode), the intra prediction mode of the 4×4 sub-block in the image to the left of the sub-block (ModeLeft), and the intra prediction mode of the 4×4 sub-block in the image above the sub-block (ModeUp). This may yield at most three candidate modes requiring examination.

If the direction mode for the sub-block is not DC mode, then up to six candidate modes may be examined 136. The six modes are the DC mode (DCMode), the intra prediction mode of the 4×4 sub-block in the image to the left of the sub-block (ModeLeft), the intra prediction mode of the 4×4 sub-block in the image above the sub-block (ModeUp), the mode corresponding to the direction mode of the sub-block (DirectionMode), and the two neighboring modes (ModeNBR1 and ModeNBR2) of the direction mode. A neighboring mode may be as shown in FIG. 1. This may yield at most six candidate modes requiring examination.

The candidate intra prediction mode yielding the lowest cost may be the intra prediction mode 138 for the 4×4 sub-block.

Figure 14:
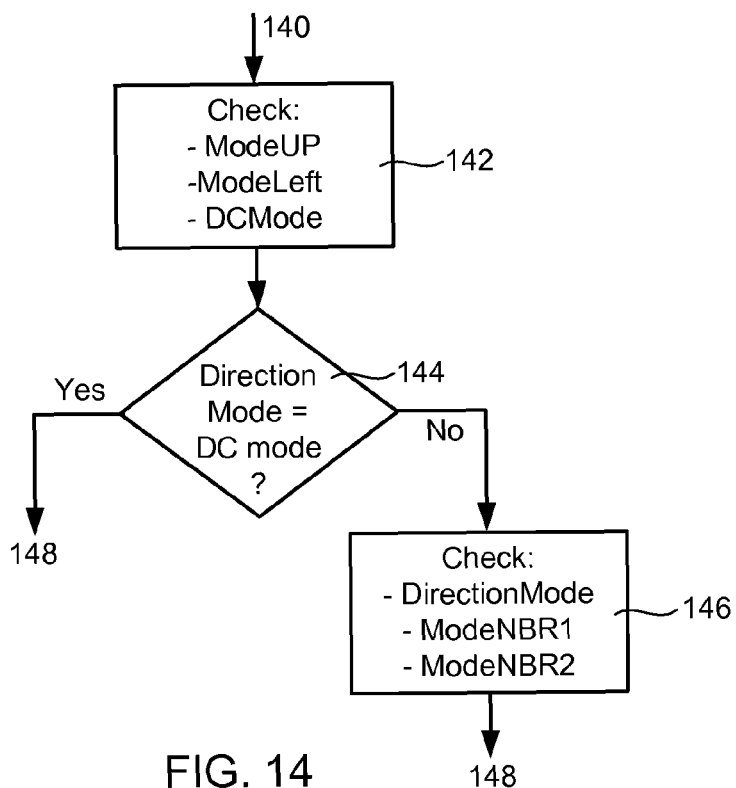
FIG. 14 is a flow diagram showing embodiments of the present invention comprising determining candidate prediction modes based on a direction mode.

An alternate embodiment of the method shown in FIG. 13 is shown in FIG. 14. In these embodiments, the three candidate modes common to both branches of FIG. 13 may be examined 142 prior to checking the direction mode of the 4×4 sub-block to determine if it is equal to DC mode 144. If it is not DC mode, then the remaining three candidate modes may be examined 146. The intra prediction mode for the 4×4 sub-block 148 may be that candidate mode yielding the lowest cost.

Figure 15:
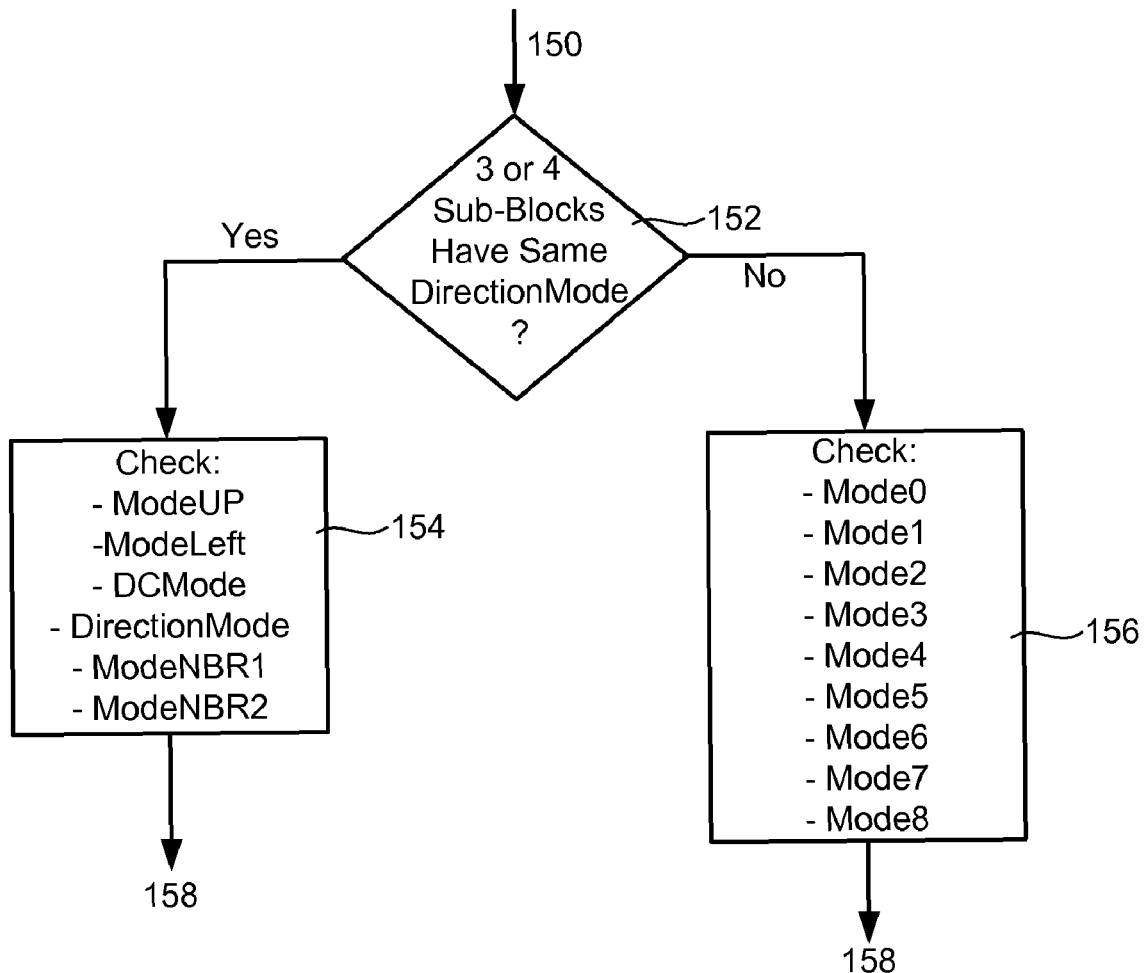
FIG. 15 is a flow diagram showing embodiments of the present invention comprising determining candidate prediction modes based on a plurality of direction modes.

FIG. 15 shows an exemplary embodiment of the present invention in which the direction mode of the sub-block may be used to reduce the number of candidate intra modes that an encoder may examine to determine the intra prediction mode. In these exemplary embodiments, the intra prediction mode for an 8×8 sub-block of a 16×16 macroblock may be determined. The direction modes for the four 4×4 sub-blocks 150 contained in the 8×8 block are examined initially 152.

If at least three of the sub-blocks have the same direction mode, then up to six candidate modes may be examined 154. The six modes are the DC mode (DCMode), the intra prediction mode of the 8×8 sub-block in the image to the left of the sub-block (ModeLeft), the intra prediction mode of the 8×8 sub-block in the image above the sub-block (ModeUp), the mode corresponding to the direction mode of the sub-block (DirectionMode), and the two neighboring modes (ModeNBR1 and ModeNBR2) of the direction mode. A neighboring mode may be as shown in FIG. 1. This may yield at most six candidate modes requiring examination.

If three of the sub-blocks do not have the same direction mode, then all nine intra prediction modes are considered candidate modes and examined 156.

The candidate intra prediction mode yielding the lowest cost may be the intra prediction mode 158 for the 8×8 sub-block.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method, in a video coder, for selecting candidate intra prediction modes for a block of samples in a picture, said method comprising:
   obtaining directional information in at least one direction for a block of samples, wherein said directional information is derived from at least one of: a first plurality of pairs of samples in said block of samples, wherein a first pair of samples in said first plurality of pairs of samples is not oriented in the same direction as a second pair of samples in said first plurality of pairs of samples, a second plurality of pairs of samples in said block of samples, wherein at least one of said pairs of samples in said second plurality of samples is not adjacent to any other of said pairs of samples in said second plurality of samples, and a third plurality of pairs of samples in said block of samples, wherein at least one of said pairs of samples in said third plurality of pairs of samples comprises a sample from the interior of said block of samples; and wherein any sample used in said obtaining is a sample within said block of samples; and
   selecting at least one candidate intra prediction mode for said block of samples based on said directional information.

2. The method as described in claim 1 wherein said obtaining directional information comprises calculating at least one direction cost wherein said at least one direction cost is associated with a direction of an intra prediction mode.

3. A method as described in claim 1 further comprising selecting an intra prediction mode for said block of samples from said at least one candidate intra prediction mode.

4. A method, in a video coder, for selecting candidate intra prediction modes for a block of samples in a picture, said method comprising:
   obtaining directional information for a block of samples, wherein said obtaining comprises calculating a plurality of direction costs, wherein:
      each of said plurality of direction costs is associated with a direction of an intra prediction mode; and
      each of said plurality of direction costs is determined using an associated plurality of sample pairs, wherein each sample in said sample pairs is within said block of samples;
   selecting at least one candidate intra prediction mode for said block of samples based on said directional information; and
   determining a direction mode for said block of samples wherein said determining comprises:
      identifying a maximum direction cost from said plurality of direction costs;
      identifying a minimum direction cost from said plurality of direction costs;
      calculating a difference between said maximum direction cost and said minimum direction cost; and
      determining said direction mode for said block of samples to be a DC direction mode when said difference is less than a threshold.

5. A method as described in claim 4 wherein said calculating a direction cost in said plurality of direction costs further comprises summing an absolute value difference in a said associated plurality of sample pairs.

6. A method as described in claim 5 wherein at least one pair of samples in said associated plurality of sample pairs contains a sample from the interior of said sub-block.

7. A method as described in claim 5 wherein said associated plurality of sample pairs is associated with a prediction mode direction.

8. A method as described in claim 4 wherein said selecting at least one candidate intra prediction mode for said block of samples depends on whether or not said direction mode is said DC direction mode.

9. A method, in a video coder, for selective application of intra prediction mode selection for a block of samples in an encoder, said method comprising:
   dividing a block of samples into a plurality of sub-blocks;
   obtaining directional information in at least one direction for at least one of said plurality of sub-blocks, wherein said directional information in a first direction is calculated using a first plurality of pairs of samples in said at least one sub-block;
   combining said directional information, thereby producing a direction cost for said block of samples;
   comparing said direction cost for said block of samples with a cost for inter coding said block of samples, thereby producing a cost comparison result; and
   selectively performing intra prediction mode selection for said block of samples based on said cost comparison result.

10. The method as described in claim 9 wherein said obtaining directional information comprises calculating a direction cost for said sub-block, wherein said direction cost for said sub-block is associated with a direction of an intra prediction mode.

11. A method as described in claim 9 further comprising:
    adjusting said direction cost for said block of samples by a scale factor, thereby producing a scaled direction cost; and
    wherein said comparing comprises comparing said scaled direction cost with a cost for inter coding said block of samples, thereby producing a cost comparison result.

12. A method as described in claim 10 wherein said calculating further comprises summing an absolute value difference in a plurality of sample pairs from said sub-block.

13. A method as described in claim 12 wherein at least one of said plurality of sample pairs contains a sample from the interior of said sub-block.

14. A method as described in claim 11 wherein said scale factor is related to a quantization parameter.

15. A method as described in claim 9 wherein said cost for inter coding said block of samples is a minimum cost of inter prediction.

16. A method as described in claim 11 wherein said selectively performing intra prediction occurs when said cost comparison result indicates said scaled direction cost is less than said cost for inter coding said block of samples.

17. A method, in a video coder, for selecting candidate intra prediction modes for a block of samples in a picture, said method comprising:
    dividing a block of samples into a plurality of sub-blocks;
    calculating at least one direction cost for at least one of said plurality of sub-blocks, wherein said calculating uses a plurality of samples, wherein each sample in said plurality of samples is within said at least one sub-block; and selecting at least one candidate intra prediction mode for said block of samples based on said at least one direction cost for at least one of said plurality of sub-blocks.

18. A method as described in claim 17 further comprising determining a direction mode for at least one of said plurality of sub-blocks wherein said determining further comprises:

identifying a maximum direction cost from said at least one direction cost;

identifying a minimum direction cost from said at least one direction cost;

calculating a difference between said maximum direction cost and said minimum direction cost; and determining said direction mode for said at least one of said plurality of sub-block to be a DC direction mode when said difference is less than a threshold.

19. A method as described in claim 17 further comprising selecting an intra prediction mode for said block of samples from said at least one candidate intra prediction modes.

20. A method as described in claim 17 wherein said calculating further comprises summing an absolute value difference in a plurality of sample pairs from said sub-block of samples.

21. A method as described in claim 20 wherein at least one of said plurality of sample pairs contains a sample from the interior of said sub-block.

22. A method as described in claim 17 wherein said selecting is dependent on a number of said sub-blocks having the same direction mode.

23. A method as described in claim 22 wherein said number is at least three.

* * * * *